(No Model.) 5 Sheets—Sheet 4.
A. DAVIDSON & C. G. ARMSTRONG.
ELECTRIC SELLING DEVICE.
No. 580,931. Patented Apr. 20, 1897.
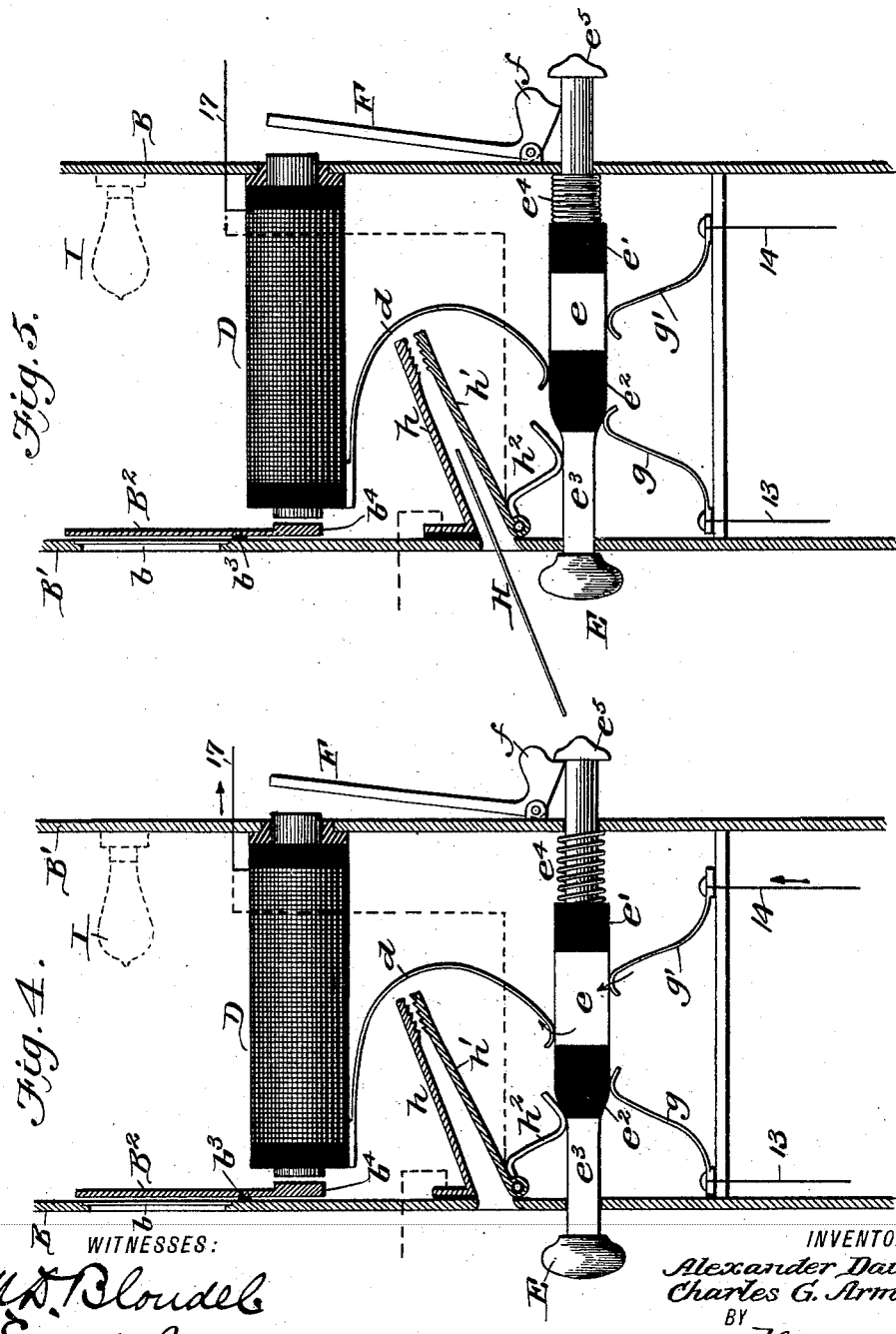
WITNESSES:
M. D. Bloudel
Edw. M. Byrn.
INVENTORS
Alexander Davidson.
Charles G. Armstrong.
BY
Munn & Co.
ATTORNEYS.

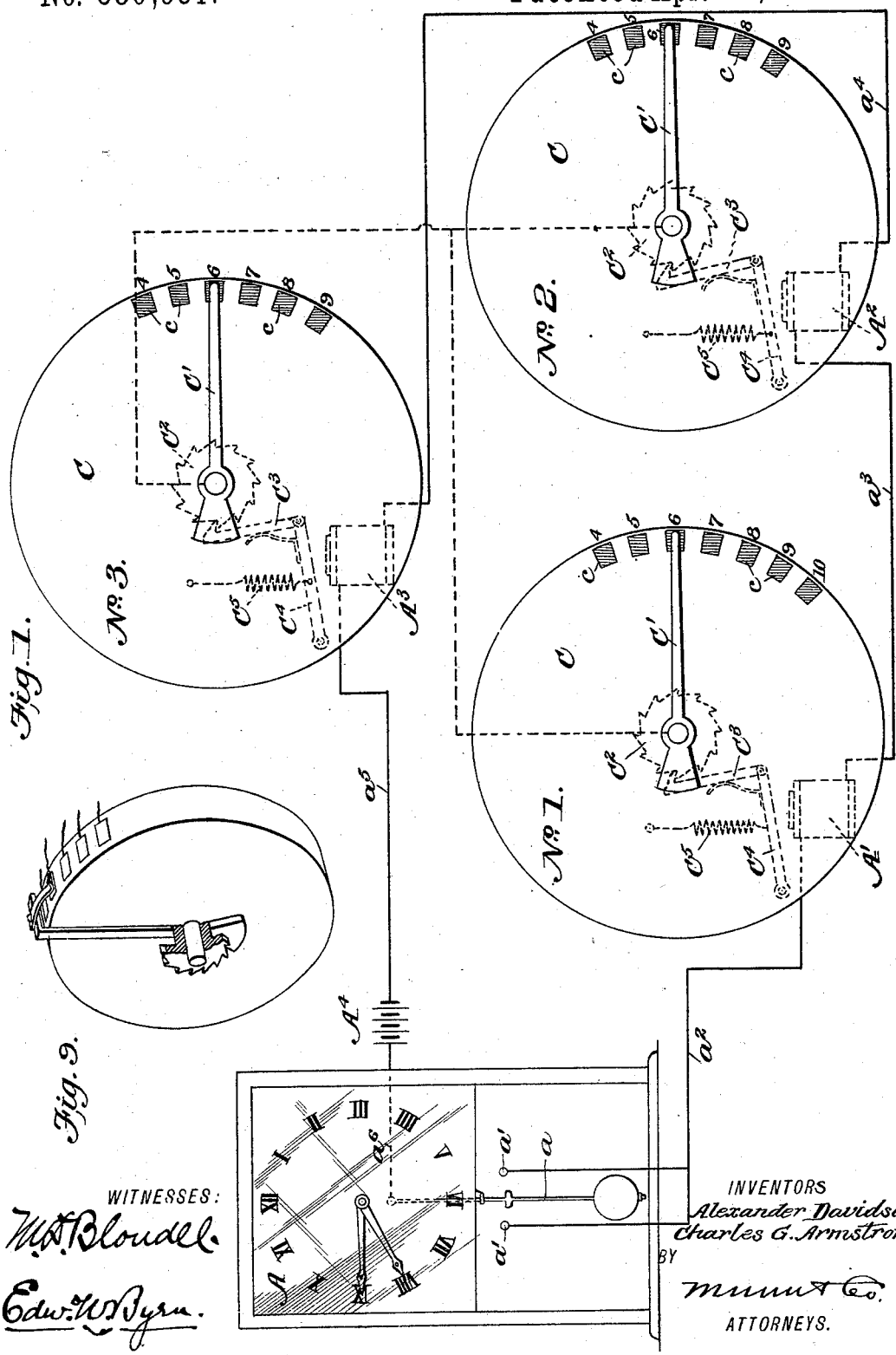

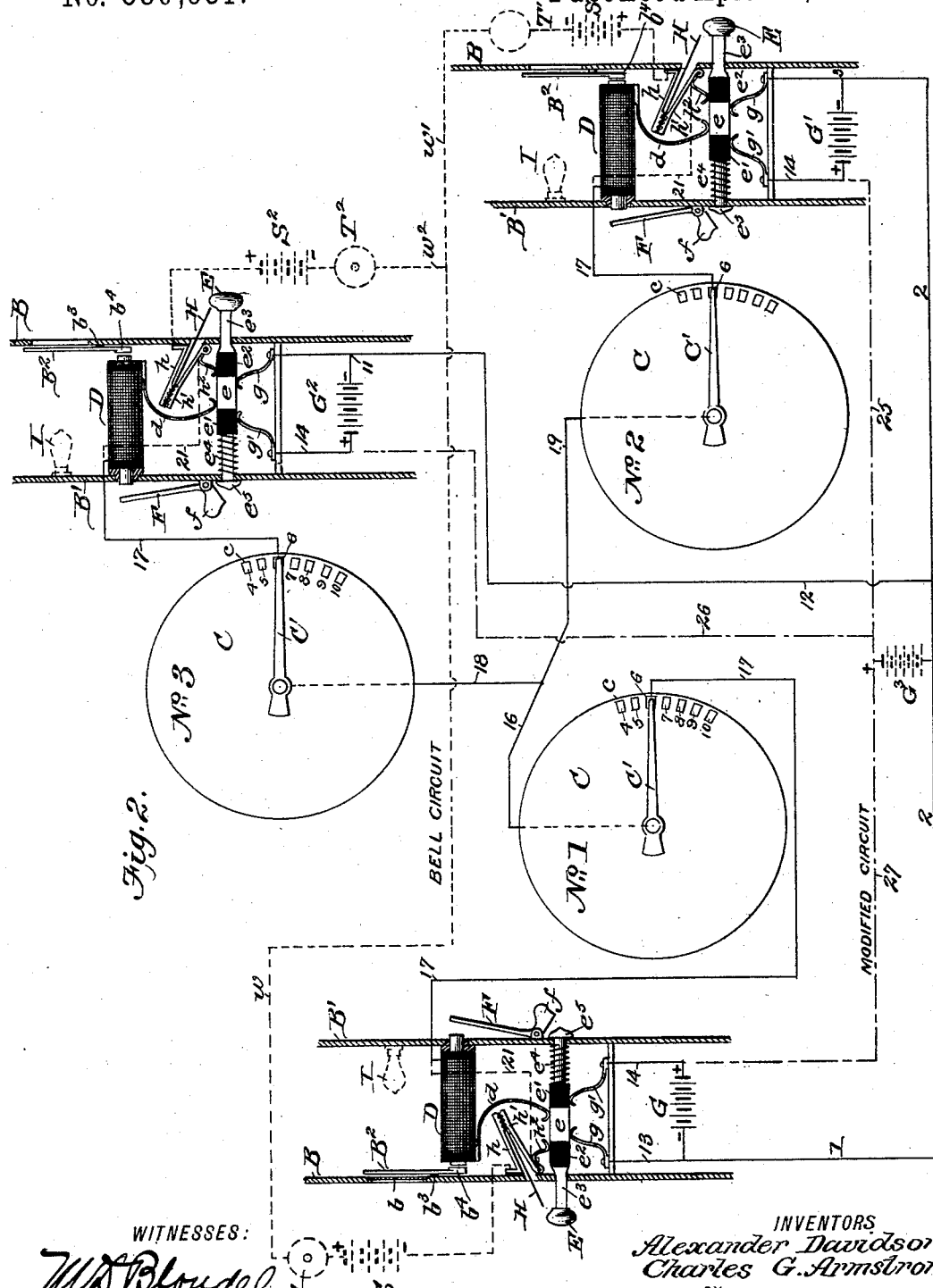

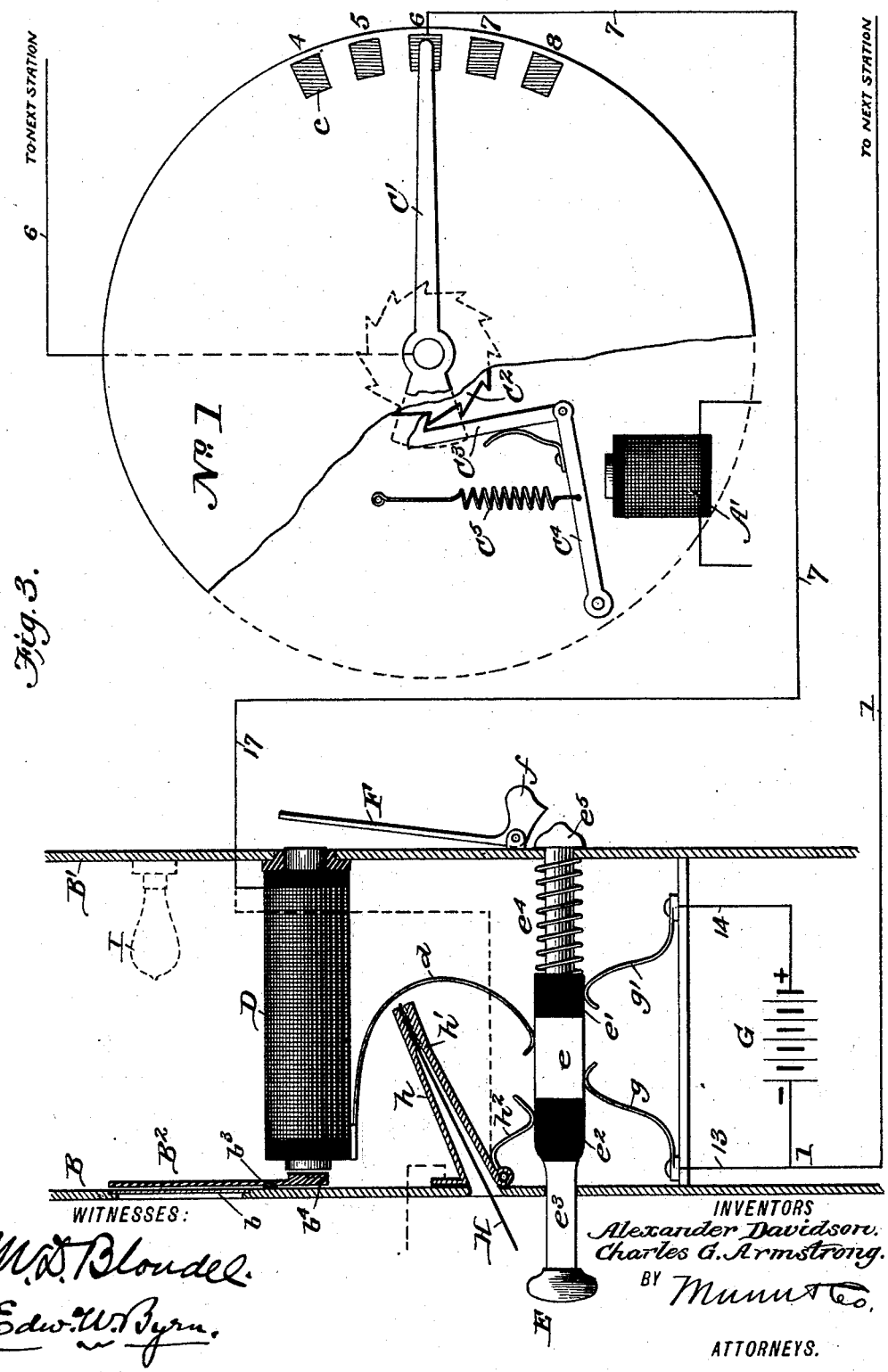

(No Model.) 5 Sheets—Sheet 5.
A. DAVIDSON & C. G. ARMSTRONG.
ELECTRIC SELLING DEVICE.
No. 580,931. Patented Apr. 20, 1897.
Fig. 6.
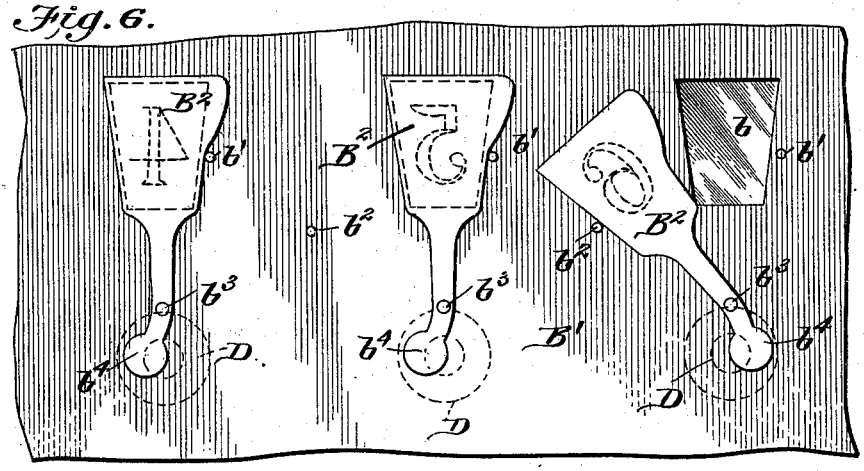
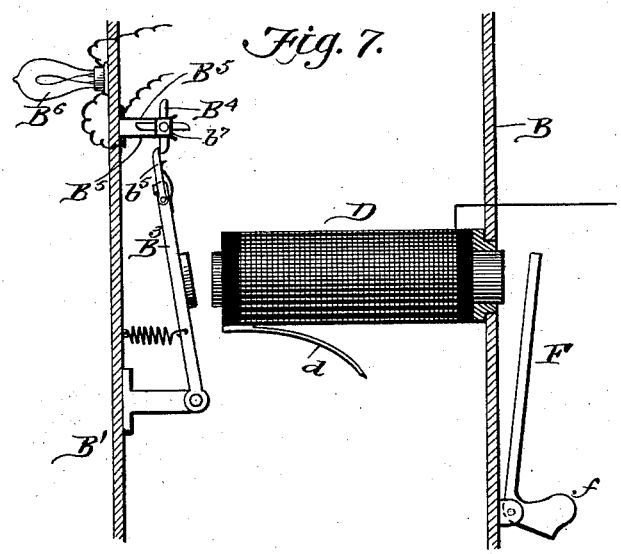
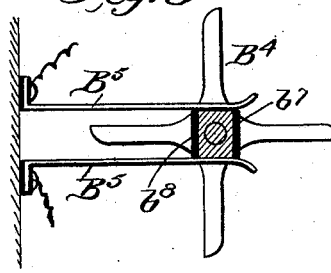
WITNESSES:
M. D. Bloudell
Edw. W. Byrn.
INVENTORS
Alexander Davidson,
Charles G. Armstrong.
BY
Munn & Co.
ATTORNEYS.

UNITED STATES PATENT OFFICE.

ALEXANDER DAVIDSON, OF NEW YORK, N. Y., AND CHARLES G. ARMSTRONG, OF CHICAGO, ILLINOIS; SAID ARMSTRONG ASSIGNOR TO SAID DAVIDSON.

ELECTRIC SELLING DEVICE.

SPECIFICATION forming part of Letters Patent No. 580,931, dated April 20, 1897.

Application filed January 25, 1896. Serial No. 576,842. (No model.)

*To all whom it may concern:*

Be it known that we, ALEXANDER DAVIDSON, of New York, in the county of New York and State of New York, and CHARLES G. ARMSTRONG, of Chicago, in the county of Cook and State of Illinois, have invented a new and useful Improvement in Electric Ticket-Selling Devices, of which the following is a specification.

The object of our invention is to provide a device to permit of the sale of reserved-seat tickets, for the theater or other occasion, at a number of different stations in such a manner as to prevent the sale of the same ticket at two different stations, the stations being connected electrically and provided each with duplicate electrical apparatus whereby the sale of a ticket at any one station instantly and automatically apprises every other station of the fact that such ticket is sold, and whereby, furthermore, if the same ticket be offered for sale at the same instant or any other time at two different points the device is rendered inoperative and either a visual or an audible signal is given.

Although primarily intended for the sale of tickets in the above manner, the invention is equally applicable to numerous other analogous uses, which will be hereinafter described.

Our invention comprises a set of synchronous clocks connected in circuit with a master-clock, each clock at each station being combined with a commutator, a local battery, signal-bell, and annunciator-board, and each annunciator-board being provided with a drop, electromagnet, ticket-holder, push-button, and contacts for each ticket held by the board, while the stations themselves are connected by a separate metallic circuit for the synchronous clocks and also by a three-wire circuit for the operative parts of the ticket-selling devices, all of which will be more fully described hereinafter with reference to the drawings, in which—

Figure 1 is a diagram view showing the master-clock, three synchronous clocks, No. 1, No. 2, and No. 3, at corresponding stations more or less widely separated, and the metallic circuit connecting these clocks. Fig. 2 is a diagram view of the three stations with their synchronous clocks, commutators, local batteries, connecting circuit-wires, signal-bells, and annunciator-boards, the latter being shown enlarged and in section. Fig. 3 is a still larger sectional view of the annunciator-board and ticket-holder and the synchronous clock and commutator of that station, the ticket being in its holder and the parts in the normal position of rest. Figs. 4 and 5 are similar sections of the annunciator-board, showing different positions of the parts. Fig. 6 is an inside face view of a portion of the annunciator-board, showing some of its drops. Fig. 7 is a sectional view through the annunciator-board, showing a modification of the signal. Fig. 8 is an enlarged detail of the electrical contacts of the same, and Fig. 9 is a view of a modified form of the commutator.

In the drawings, referring to Fig. 1, A is a master-clock whose pendulum imparts a synchronous movement to the hands $C'$ of synchronous clocks at the three stations, No. 1, No. 2, No. 3. As these clocks are exactly alike, it will be sufficient to describe one of them, as that at station No. 1, for instance. The clock comprises a radial hand $C'$, (having the function of a commutator-brush, as hereinafter described,) which hand is rigidly attached to a ratchet-wheel $C^2$, actuated progressively in one direction by a hooked pawl $C^3$, which is oscillated by an armature $C^4$, moving downward in response to the electromagnet $A'$ and upward in response to the spring $C^5$. Each clock has its electromagnet $A'$ $A^2$ $A^3$ arranged in a single circuit $a^2$ $a^3$ $a^4$ $a^5$ of a battery $A^4$, one side of which is connected through wire $a^6$ with the pendulum $a$ of the master-clock and the other side of which is, through the circuit above described, connected to the two contacts $a'$ $a'$. Now whenever the pendulum of the master-clock touches either contact $a'$ the circuit of the battery $A^4$ is closed through the magnets $A'$ $A^2$ $A^3$ of each of the synchronous clocks at the different stations and an equal movement is imparted to the radial hands $C'$ of all of said clocks at the different stations. The clock-hands $C'$, as before stated, have the functions of commutator-brushes, and for this purpose they sweep over and make contact with a series of insulated commutator-plates $c$, arranged around the face of the clock. These plates correspond in number to the tickets to be sold, and the synchronous clocks are so arranged that in the movement of their hands when one hand $C'$ is resting upon a plate 6 the hands of every other synchronous clock is at the same time resting upon a corresponding plate 6. It is not intended that the hands $C'$ shall move slowly over the commutator-face, but are designed to have as rapid a movement as practicable, so that said hands shall sweep entirely around the circle in a time not longer than five seconds, and for this purpose we do not confine ourselves to a synchronous clock actuated by electricity, but may use any other synchronous clock, as, for instance, one operating pneumatically or otherwise.

Referring now to Fig. 2, the synchronous clocks (without their actuating-circuit) are shown in relation to the connections on the annunciator-boards of their respective stations and the wires which connect them between stations. Before describing their cooperation, however, we will first describe the mechanical construction of the annunciator-board and the connections of its parts. Referring to Fig. 3, which shows these parts on a larger scale, B is the front, and $B'$ the back, of a hollow annunciator-board. This annunciator-board has in its front wall a series of openings $b$, corresponding in number to the number of tickets to be sold. Behind each one of these openings is a drop-shutter $B^2$, pivoted or hinged at $b^3$ and having an armature end $b^4$, which plays in front of an electro-magnet D. This shutter plays back and forth across the openings $b$, so as to close it in one position and expose it in another. This drop-shutter (see Fig. 6) plays between a stop-pin $b'$ on one side and another $b^2$ on the other side. When the shutter is open, as on the right of Fig. 6, and resting against stop $b^2$, its lower armature end $b^4$ occupies a position on one side of the pole of the magnet D, and when it is resting against the stop $b'$, as on the left, said armature end $b^4$ occupies a position on the other side of the axis of the magnet, so that one electrical impulse in the magnet will open and the alternate one will close the shutter, the shutter moving at right angles to the longitudinal axis of the magnet.

The stops $b'$ and $b^2$ are so arranged that the shutter $B^2$ will pass by the vertical line of its fulcrum $b^3$ and stop at the end of its throw in either direction against the pins $b'$ or $b^2$, as the case may be. These shutters bear on their outer faces (so as to be visible through the openings $b$) figures corresponding to the numbers of the tickets to be sold, but, if desired, (see Fig. 3,) the figures may be placed on glazed panels on the openings $b$ and a blank opaque shutter used in connection with an incandescent lamp, as shown at I in dotted lines, or any other means of illumination.

The magnets D, Fig. 3, corresponding to each ticket-shutter, are sustained upon the back wall $B'$ of the annunciator-board, and have each a curved contact-spring $d$ depending therefrom in electical connection with its coil. Just in front of this spring, below the magnet and opening through the front wall of the annunciator, is a ticket-socket for the ticket H. This ticket-socket is arranged in inclined position, so that the ticket will readily drop out when released, and is composed of a jaw $h$, which is stationary and serrated at its back end, and a lower jaw $h'$, which is also serrated at its back end where it clamps the ticket, but is at its front end hinged so as to be movable, and has an attached adjusting-spring $h^2$.

Sliding in guides in the annunciator-frame is a push-button E, arranged just below the ticket-socket, so that one hand can be used to push in the button and receive the ticket. This push-button has a stem with a middle portion of relatively large diameter and a front part $e^3$ of smaller diameter. When the push-button is out, as shown, the spring $h^2$ of the lower movable jaw of the ticket-socket rests upon the larger portion of the stem and holds the said jaw $h'$ up, so as to tightly clamp the ticket, which cannot be withdrawn on account of the serrations of the jaws; but when the push-button is forced in, as in Figs. 4 and 5, the spring $h^2$ drops down onto the smaller portion of the stem, allowing the jaw $h'$ to fall and release the ticket. This movement of the push-button is also made to adjust the electrical circuits, so as to transmit the signal to the other stations, and for such purpose its larger middle part has a brass-covered conductive sleeve $e$ with non-conducting hubs $e'$ $e^2$ on opposite sides of the same, which surfaces coöperate with two subjacent spring-contacts $g$ and $g'$ and effect electrical connection alternately between contact-springs $d$ and $g$ and $d$ and $g'$, according to the position of the push-button.

On the rear end of the push-button stem is a helical spring $e^4$, which normally holds the push-button to the front, and restores it to its projecting position after being pushed in. On the extreme end of this stem, however, is a head $e^5$, which is adapted to be caught behind and held by a latch $f$, projecting as an elbow from an armature-lever F, which is fulcrumed at the back of the annunciator, and extends up to range of attraction by magnet D. This serves to hold the push-button in after it is forced back until an impulse in the magnet D attracts armature F and releases it.

Referring now to Fig. 2, we will describe how the stations are electrically connected and the withdrawal of a ticket is made to send a distinguishing-signal to all the other stations, indicating to each one that such ticket has been sold. Each station is provided with its own local battery, as shown at G, $G'$, and $G^2$, and these batteries all have their negative poles connected to each other and their positive poles also arranged for connection through the adjustment of the push-buttons acting as switches. Thus the negative pole of battery G of station No. 1 connects, through wire 1 2 3, with the negative pole of battery G' of station No. 2 and through wire 1 2 12 11 with the negative pole of battery $G^2$ of station No. 3. The negative pole of each battery is also connected with each one of the springs $g$ of the several annunciator-boards. The positive pole of each battery goes through wires 14 to spring $g'$ and through the push-button (when properly adjusted) to spring $d$ and one terminal of the helix of magnet D. The other end of the magnet-helix is attached by wire 17 with its particular commutator-plate 6, it being understood that every ticket-holder has its magnet D and its commutator-plate, as 6 of the series $c$, which series of plates correspond in number to the whole number of tickets to be sold. Contact with these commutator-plates is made by the hands $C'$ of the synchronous clocks as said hands rapidly sweep around the circle, and these hands of the clocks at all the stations are electrically combined through their axes by wires 16 18 19. In addition to these circuits there is another shown in dotted lines marked "Bell-circuit," which is intended for the signal-bell and for the sake of clearness and to avoid confusion and prolixity had best be separately described.

We will therefore now proceed to describe how the sale of a ticket at any one station at once and automatically notifies all of the other offices. When the push-buttons are all at rest in their normal outermost position, there is no current on the line, because all the batteries have their negative poles connected by the electrical connection of springs $d$ and $g$ through the brass piece $e$ of the push-buttons. Thus starting at station No. 1 we pass from the negative side of the battery G to wire 13, spring $g$, brass piece $e$, spring $d$, magnet D, wire 17, commutator-plate 6, revolving hand $C'$, wires 16 18 19 to the commutator-hands $C' C'$, plates 6 6, wires 17 17, magnets D D, springs $d d$, brass pieces $e e$, springs $g g$ to the negative sides of the batteries $G' G^2$, the positive sides of all batteries being disconnected by the springs $g'$ resting upon the non-conducting surfaces $e'$; but suppose a ticket H (for seat 6, say) is sold at station No. 1. The agent presses in the push-button E, which movement releases the ticket and allows it to drop out into his hand, as shown in Fig. 5, and the push-button from the action of its spring $e^4$ then immediately moves outward again, but does not reach its normal outermost position, but its rear head $e^5$ catches against and is retained by the latch $f$ of the armature F, as shown in Fig. 4. When the push-button is left in this position, the brass $e$ connects spring $g'$ and spring $d$, as shown in Fig. 4, and the current from the positive pole of battery passes over wire 14, springs $g'$ and $d$, through brass $e$, magnet D, wire 17, plate 6, commutator-hand $C'$, over line-wires 16 18 19 to the other stations, entering these commutator-hands, and whenever these strike their commutator-plates 6 the current passes through each station over wire 17, magnet D, spring $d$, brass $e$, spring $g$, wire 3, wires 2 and 1 to the opposite pole of battery G, the batteries G' and $G^2$ being dead by reason of their positive poles being connected with the springs $g'$, which rest upon the non-conducting surfaces $e'$ of the normally-placed push-buttons. It will be seen from the foregoing then that when push-button of station No. 1 is forced in to discharge and sell its ticket H (for a seat 6) the magnets D of all the stations will be energized just at the moment that the commutator-hands of said station touch the plates 6, and as these magnets D are arranged to operate the drop-shutters No. 6 of the annunciator-boards of these stations the drop-shutters No. 6 leave their windows and indicate to the agents that seat No. 6 has been sold. When the push-button E is forced in, it is caught and held, as shown in Fig. 4, by the latch $f$, with springs $d$ and $g'$ electrically connected on the brass $e$, so that the sweep of the commutator-hands $C'$ of all the stations will, when they touch their plates 6, close the circuit last described and by acting on the home magnet D will attract its armature F (as well as its drop-shutter) and release the head $e^5$ of the push-button and allow the latter to pass out again to its normal position. This locking of the push-button for a time in the position shown in Fig. 4 is to hold these connections closed electrically long enough to allow the commutator-hands at the remote stations to make the circuit of their dials. Furthermore, the releasing of the latch $f$ and push-button at the selling-station constitutes a return-signal from the remote stations that the sale of that ticket had been properly recorded at such remote stations.

Now assuming that two station-agents should at the same instance draw out and attempt to sell the same ticket by simultaneously pushing in corresponding buttons, (or should attempt to sell a ticket already sold,) this will render the device inoperative and the shutter will not move, and the agents must at once restore the tickets again. To establish this clearly, we will suppose that at station No. 1 and station No. 2 tickets for seat 6 have been simultaneously pulled out and their respective push-buttons forced into the position shown in Fig. 4. This, it will be seen, connects $g'$ and $d$ and throws $g$ out. Assuming this condition of things to exist at stations Nos. 1 and 2 of Fig. 2, the positive pole of battery G would connect with 14, $g'$, $e$, $d$, D, 17, 6, $C'$, 16, 19, $C'$, 6, 17, D, $d$, and (push-button being in) $e$, $g'$, 14 to positive pole of battery G'. We should therefore have the two positive poles of the two batteries G and G' antagonized and no current on the line nor through the instruments.

In such a contingency as that just described we have an additional audible signal to provide for any carelessness of the agents who fail to observe the visual signal, and for this purpose we arrange at each station a signal battery and bell. (Shown at S and T in station No. 1, S' T' in station No. 2, and S² T² in station No. 3.) The positive side of battery S of station No. 1 is connected through wires $w\ w'\ w^2$ to the negative side of each of the other batteries, and the circuit 17 16 18 19 is utilized for the return-wire circuit of the signal-bell. The two jaws $h$ and $h'$ of the ticket-holder on the annunciator-board are insulated from each other and are made for all the stations terminals of this signal-bell circuit. Thus in station No. 1 the negative side of battery S connects with the stationary jaw $h$, (and all the other stationary jaws of that station,) while a wire 21 from the lower movable jaws of all the stations shunts the magnets D and connects with the circuit 17 16 18 19, so that when two tickets for the same seat are withdrawn from the two jaws of the ticket-holders at the same time (or one after the other) at two different stations the bell-circuit from the batteries S S' S² will be closed through these two pairs of terminals and the bells at both stations will ring, but when one pair of jaws close by the withdrawing of only one ticket at one station the circuit will not be closed and the bells will not ring.

In making use of our invention we may duplicate the apparatus and use one part merely for indicating the engagement of a ticket and the other for the actual sale and delivery of the ticket, and for this purpose we may use as signals different-colored electric lights, which may be arranged to be turned on or off, as shown in Figs. 7 and 8, in which the magnet D acts upon an armature B³, which has a spring-pressed articulated end $b^5$, that is arranged to impart as it vibrates a step-by-step movement to a star-wheel B⁴, the articulated end $b^5$ bending and passing the star-wheel arms when moved in one direction and engaging and turning them when moved in the other direction. This star-wheel has a square conducting-hub of metal, on the opposite sides of which are two insulating-plates $b^7\ b^8$, Fig. 8. Two springs B⁵ B⁵ form the terminals of an incandescent lamp B⁶, and these springs are alternately connected through the hub and insulated at the quarter-turn by the plates $b^7\ b^8$, so as to alternately illuminate and put out the lamp. This lamp-signal may be used, if desired, in place of the annunciator-drop hereinafter described.

In arranging the circuits for actuating our invention they may be connected either with a battery or with a dynamo.

It is not necessary that there should be a separate battery G G' G² at each station, but a single strong centrally-placed battery or dynamo could be arranged to perform the same work. Thus, for instance, as shown in Fig. 2 by the dot-and-dash circuit marked "Modified circuit," a battery G³ might have its positive pole connected by wires 25 26 27 with the wires 14 and spring $g'$ of the different stations and its negative side with the wire 2, leading to the contact-spring $g$ of the different stations, in which case the separate batteries G G' G² might be dispensed with.

The commutators may be constructed so as to cause the brush to sweep over a series of stationary plates, as shown, or the plates themselves may be made to move over a stationary brush, and such commutators may be fashioned either in the form of a disk, as in Figs. 1, 2, and 3, or cylinder, as shown in Fig. 9. It will therefore be seen that we do not confine ourselves to the particular construction and arrangement of devices shown, as these may in many details be varied without departing from the general principle of our invention.

With reference to the various applications to which our invention may be put we not only propose to use it for the sale of theater, opera, and amusement tickets, but for sleeping and parlor cars, rooms at hotels, steamship-berths, and all analogous uses.

Having thus described our invention, what we claim as new, and desire to secure by Letters Patent, is—

1. A device for selling tickets at a number of different stations and automatically indicating to all the remote stations the sale of any ticket at any station, comprising a series of stations each having an annunciator with individual ticket-holders, a commutating device, and a common synchronizing mechanism, said stations being electrically connected for perfect synchronism between the commutators of said stations, and for reciprocal action between the annunciators and ticket-holders of the different stations substantially as set forth.

2. A device for selling tickets at a number of different stations and automatically indicating to all the remote stations the sale of any ticket at any station, comprising a series of similarly-equipped stations each having an annunciator with individual ticket-holders, a commutating device, and a common synchronizing mechanism, said stations being electrically connected for perfect synchronism between the commutators of said stations and reciprocal action between the annunciators and ticket-holders of the different stations, and each ticket-holder having a separate push-button or switch, means for temporarily holding the push-button or switch to its operative position during the sweep or traverse of the commutator, and one or more actuating-batteries and circuit-wires connecting the stations substantially as shown and described.

3. A device for selling tickets at a number of different stations and automatically indicating to all the remote stations the sale of any ticket, comprising, an annunciator-board having individual ticket-holders, an individual magnet, and individual push-button or switch for each ticket-holder, each station having one of said annunciators, and a synchronized clock with commutator, and a battery or batteries with circuit-wires connecting said stations substantially as and for the purpose described.

4. A device for selling tickets at a number of different stations, and automatically indicating to all the remote stations the sale of any ticket, comprising an annunciator-board having individual ticket-holders, drop-signals, magnets, and push-buttons for each ticket, each station having one of said annunciators, a synchronized clock with commutator, and a battery, circuit-wires between the stations connecting the annunciators and commutators, and a separate signal-bell for each station, and a battery and bell circuit between the stations formed in part by a single separate wire and in part by the circuit of the annunciators substantially as shown and described.

5. A compound annunciator comprising a set of synchronized clocks and commutators, one clock and commutator being arranged at each station, an annunciator and separate battery at each station, circuit-wires connecting like poles of each battery at the several stations, spring-contacts connected to the opposite poles of the battery at each station, a magnet and contact-spring for each indication of the annunciator, and a push-button or switch for each magnet playing between and controlling the connection between the battery and its magnets substantially as and for the purpose described.

6. A ticket-selling device for selling tickets at different stations without interference, comprising a series of annunciators, each annunciator having for each ticket a pair of insulated pinching-jaws forming the ticket-holder and also the terminals of an electric circuit running to all the other annunciators, a separate bell and battery on this circuit for each station, the insulated pinching-jaws being arranged in circuit to close the same through the bells only when two or more pairs of said jaws are closed by the withdrawal of the same ticket at different stations substantially as and for the purpose described.

7. The ticket-selling devices herein described comprising the holder having a fixed jaw $h$, and movable jaw $h'$ with an operating spring-arm $h^2$; in combination with a spring-seated push-button E having enlarged middle part with conducting-surface $e$ and non-conducting surfaces $e'$ $e^2$ on opposite sides of the same, a battery with contact-springs $g$ $g'$, and an annunciator drop-magnet D with contact-spring $d$ substantially as shown and described.

ALEXANDER DAVIDSON.
CHARLES G. ARMSTRONG.

Witnesses:
EDW. W. BYRN,
SOLON C. KEMON.